(12) United States Patent
Maheshwari et al.

(10) Patent No.: US 8,612,486 B2
(45) Date of Patent: *Dec. 17, 2013

(54) CONFIGURATION MANAGEMENT VISUALIZATION

(75) Inventors: Nitin Maheshwari, Andhra Pradesh (IN); Srikanth Venumbaka, Andhra Pradesh (IN); Abed Ali, New York, NY (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/423,398

(22) Filed: Mar. 19, 2012

(65) Prior Publication Data

US 2012/0226717 A1  Sep. 6, 2012

Related U.S. Application Data

(63) Continuation of application No. 12/472,139, filed on May 26, 2009, now Pat. No. 8,195,706.

(51) Int. Cl.
  *G06F 17/30* (2006.01)
  *G06F 11/07* (2006.01)

(52) U.S. Cl.
  CPC .................................. *G06F 11/0709* (2013.01)
  USPC ........... 707/798; 707/778; 707/794; 707/805; 707/809

(58) Field of Classification Search
  CPC .................................................. G06F 11/0709
  USPC ............. 707/1, 100, 104, 778, 798, 803, 790, 707/802, 809, 811
  See application file for complete search history.

(56) References Cited

U.S. PATENT DOCUMENTS

| | | | |
|---|---|---|---|
| 6,449,624 B1 | 9/2002 | Hammack et al. | |
| 7,150,015 B2 | 12/2006 | Pace et al. | |
| 7,599,944 B2 | 10/2009 | Gaurav et al. | |
| 7,755,786 B2 | 7/2010 | Foehr | |
| 7,822,785 B2* | 10/2010 | Ayachitula et al. | 707/804 |
| 7,890,951 B2 | 2/2011 | Vinberg et al. | |
| 7,926,031 B2 | 4/2011 | Faihe et al. | |
| 8,010,571 B2* | 8/2011 | Knoblock et al. | 707/792 |
| 8,307,327 B2* | 11/2012 | Delima et al. | 717/105 |

(Continued)

OTHER PUBLICATIONS

"U.S. Appl. No. 12/472,139, Response filed Dec. 15, 2011 to Non Final Office Action mailed Sep. 15, 2011", 14 pgs.

(Continued)

*Primary Examiner* — Dangelino Gortayo
(74) *Attorney, Agent, or Firm* — Schwegman Lundberg & Woessner, P.A.

(57) ABSTRACT

Embodiments herein include systems, methods, software, and data structures to generate and render visualizations of configuration items (CIs) represented in a Configuration Management Database (CMDB). One embodiment includes receiving a request for a CI graph from a client including a focus CI identifier represented in a CMDB. The focus CI may be used to retrieve data of related CIs, the data including CI identifiers. A process is then executed for each retrieved CI identifier to retrieve CI data as a function of the received CI identifier and to build a node XML and an edge XML representation of relations between the CIs. This method also includes aggregating the node and edge XML representations into a single XML document and then translating the document into a markup language document capable of being rendered in a graphical user interface. The markup language document is then transmitted to the requestor.

14 Claims, 10 Drawing Sheets

(56) References Cited

U.S. PATENT DOCUMENTS

| | | |
|---|---|---|
| 2005/0005233 A1 | 1/2005 | Kays et al. |
| 2005/0114851 A1* | 5/2005 | Watson-Luke et al. ....... 717/168 |
| 2008/0094399 A1 | 4/2008 | Heinkel et al. |
| 2009/0157419 A1 | 6/2009 | Bursey |
| 2009/0193036 A1 | 7/2009 | Petri |
| 2010/0100870 A1 | 4/2010 | Vandanapu |
| 2010/0306275 A1 | 12/2010 | Maheshwari et al. |

OTHER PUBLICATIONS

"U.S. Appl. No. 12/472,139, Non Final Office Action mailed Sep. 15, 2011", 22 pgs.

"U.S. Appl. No. 12/472,139, Notice of Allowance mailed Feb. 15, 2012", 10 pgs.

* cited by examiner

Fig.3

CONFIGURATION MANAGEMENT VISUALIZATION

RELATED APPLICATION

This application related to and is a continuation of U.S. application Ser. No. 12/472,139, filed May 26, 2009, to which priority is claimed and the entirety of which is incorporated herein.

BACKGROUND INFORMATION

Data processing environments of an organization becomes more complex as the number of devices, applications, and processes increases. Most devices, applications, and processes added to the computing environment of the organization need to be configured and subsequently managed in view of one another. A Configuration Management Database is a tool by which such configuration management may be performed.

A Configuration Management Database (CMDB) includes a database of Configuration Items (CI), often ranging from a few thousand to millions. A configuration item stored in the CMDB typically represents a component of a data processing and network infrastructure. Such components may include one or both of hardware and software components and even data such as a request for change, associated with an infrastructure component that is, or is to be, under the control of Configuration Management. CIs may vary widely in complexity, size, and type, from an entire system, including all hardware, software and documentation to a single module or a minor hardware component.

Due to the large amount of data that may exist in a CMDB and complex relations between CIs represented therein, providing a visualization of an environment represented in the CMDB is difficult and a resource intensive process.

SUMMARY

Various embodiments herein include one or more of systems, methods, software; and data structures to generate and render visualizations of configuration items (CIs) represented in a Configuration Management Database (CMDB). One such embodiment provides a method that includes receiving a request for a CI graph from a client including a focus CI identifier represented in a CMDB. The focus CI may be used to retrieve data of related CIs, the data including CI identifiers. A process is then executed for each retrieved CI identifier to retrieve CI data as a function of the received CI identifier and to build a node XML and an edge XML representation of relations between the CIs. This method also includes aggregating the node and edge XML representations into a XML document and then translating the document into a markup language document capable of being rendered in a graphical user interface. The markup language document is then transmitted to the requestor.

Another embodiment is in the form of a system. The system in such embodiments includes at least one processor, at least one memory device, and a network interface coupled to a bus. The system also includes a handler module, a builder module, a manager module, and a graph generator held in the at least one memory device and operable on the at least one processor.

The handler module is operable to receive, from a requestor over the network interface device, a request for a configuration item graph. The request may include an identifier of at least one focus configuration item represented in a configuration management database and the at least one focus configuration item is typically a configuration hem from which to generate a configuration item graph. The configuration management database stores data representative of configuration items on a data storage device and accessible via the network interface device. The handler module is further operable to retrieve, from the configuration management database via the network interface device, configuration item data of configuration items related to the focus configuration item, the data including configuration item identifiers. The handler module may then provide a configuration item identifier to an instance of the builder module.

The builder module is typically operable to retrieve data of the configuration hem from the configuration management database via the network interface device as a function of a configuration item identifier received from the handler module. The builder module may then build a node XML representation of the configuration item and an edge XML representation of how the configuration item is related to a parent configuration item, when there is such a relation. The builder module then provides the node and edge XML representations to a manager module.

The manager module is typically operable to aggregate all node and edge XML representations received from the builder module into a single XML document and to provide the single XML document to a graph generator module. The graph generator module is typically operable to translate the single XML document received from the manager module into a markup language document capable of being rendered in a graphical user interface of the requestor. The graph generator module may then transmit, via the network interface device, the markup language document to the requestor.

BRIEF DESCRIPTION OF THE DRAWINGS

FIG. 3 is a user interface illustration of a Configuration Item search tool according to an example embodiment.

DETAILED DESCRIPTION

Figure 1:
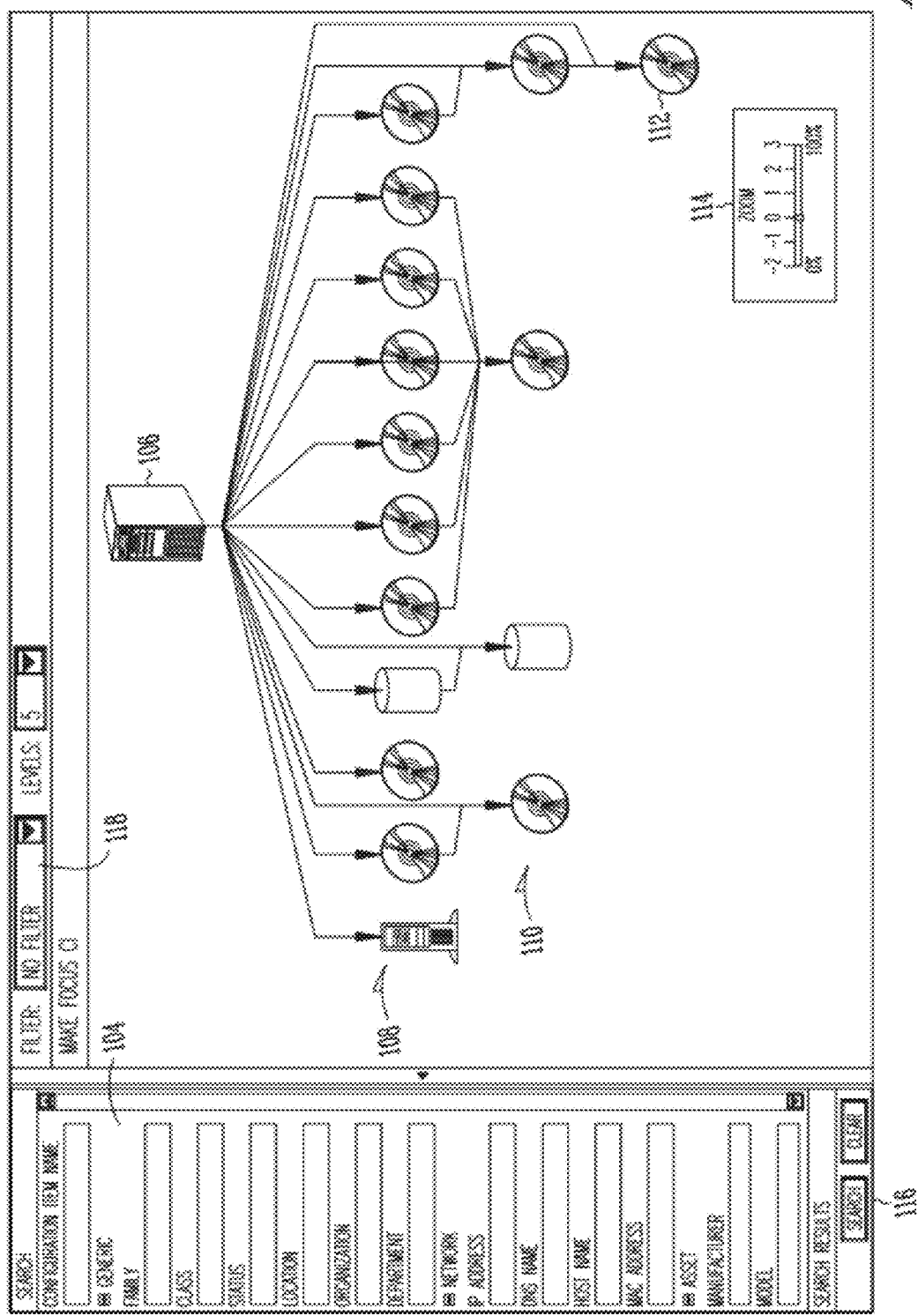
FIG. 1 is a user interface illustration including a visualization of a plurality of Configuration Items according to an example embodiment.

Various embodiments herein include one or more of systems, methods, software, and data structures to generate and render visualizations of configuration items (CIs) represented in a Configuration Management Database (CMDB). The generation of a visualization may include reutilizing portions of previously generated visualizations cached on one or both of a client computing device or a server to reduce the resources needed to generate a requested visualization. When all or a portion of a requested CI visualization is cached, embodiments may include distributing tasks associated with generating CI visualization portions for individual CIs to individual processes that are executable on individual processors in a multiprocessor computing device or individual processing cores of a multiprocessing core computer processor. As a result of this distributing, the computing resources of a multiprocessor/processing-core system are more efficiently utilized. Some embodiments further include filters that may be applied to CI visualizations to modify a visualization appearance. The filters may include predefined filters that filter a visualization for a specific purpose such as identification of configuration issues, root cause analysis, impact analysis, and other purposes. Filters may also be defined by users. These, and other embodiments, are described in detail herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a user interface 116 illustration including a visualization 102 of a plurality of Configuration Items (CIs) according to an example embodiment. The visualization 102 is an example visualization that may be generated from data stored in and retrieved from a Configuration Management Database (CMDB). The visualization 102, which may also be referred to interchangeably as a graph, is generated based on a selection of a focus CI, represented in the visualization as CI 106. In some embodiments, two or more focus CIs may be selected and the following process may produce a single graph if the selected focus CIs are related or multiple, disjointed graphs if the selected focus CIs are not related. Returning to the illustrated embodiment of FIG. 1, the focus CI 106 may be selected within the user interface 116 by first performing a search in a search interface displayed in sidebar 104. Further details of the search interface are provided below with regard to FIG. 3. Search results may then be displayed in the sidebar 104 in an interface, such as illustrated in and described with regard to FIG. 5. The focus CI 106 may be selected in the search results displayed in the sidebar 104 and a request sent to a configuration management database to obtain the visualization 102. In some embodiments, the visualization 102 may also be obtained from other logical locations and applications. For example, if a user is viewing attributes of a particular CI, the user may be presented with the option to view a visualization based on the particular CI. The particular CI may be selected as the focus CI and a visualization 102 may be obtained with the particular CI at the top of or otherwise included in the visualization.

The visualization 102 includes a tree-like structure representative of a computing environment topology comprised of nodes and edges. Note that in other instances, the visualization may provide another view type, such as a circular structure, square structure, or other shape depending on the relationships between the nodes defined by the edges as the nodes are the CIs and the edges are relationships between the CIs. The CIs represented by nodes may include one or both of hardware and software components and even data such as a request for change, associated with an infrastructure component that is, or is to be, under the control of Configuration Management. Other CIs may also represent one or more of services, projects, and the like which are not necessarily physical in nature, instead being more logical in nature. Hardware CIs may include server computing devices, routers, firewall appliances, switches, client computing devices, storage devices, hardware components within particular devices, and other hardware machines and devices therein. Software CIs may include server application processes, software/firmware resident and executable on hardware devices, firewall application processes, applications installed on particular hardware CIs, and the like. Relationships represented by edges between the nodes may include logical relationships, such as relationships that may exist between nodes within data processing logic, or physical relationships, such as network interconnections, a software process node that execute on particular hardware node, and the like.

The visualization 102 includes the focus CI 106 and other relational levels of CIs 108, 110, 112 connected by edges. As described above, the edges that connect the CIs 106, 108, 110, 112 are relationships there between. As a result, visualization 102 provides a topology view of a computing environment. The visualization may provide a physical topology view, a logical topology view, or a mix view of physical and logical topologies. The visualization 102 view may be manipulated through use of the zoom tool 114 to zoom in and out for greater or lesser detail. In some embodiments, a user may obtain further information with regard to individual nodes and edges through manipulation of a gesture device, keyboard, touch screen displaying the user interface 116, or other input mechanisms. For example, a user may hover over anode with a pointer using a gesture device, such as a mouse, and further information about the node may be displayed. Another example may be selection of a node or edge which may then cause the further information or less information to be displayed. In some embodiments, such a selection may cause a change in the focus CI the visualization 102 is built upon. In other embodiments, the selection may include selecting a different number of CI levels to include in the visualization 102, such as increasing or decreasing the number of levels.

The visualization 102 may also be manipulated by applying a filter, such as through the filter selection control 118 of the user interface 116. Selection of a filter, in some embodiments, will cause the visualization to be modified in a manner consistent with the selected filter. Selection of a filter specifies which types of CIs and relationships the user wants to see in the user interface. Application of a filter to the visualization 102 will modify the visualization 102 to display the nodes and edges that correspond to those CIs and relationships. In some instances, all of the data of CI nodes and edges for a selected filter may be present on a client computing device of the user and the visualization 102 may simply be modified. However, if all of the data of the CI nodes and edges for the selected filter are not present, a request for further data may be communicated over a network to a visualizer server which will obtain the needed data, build data structures representative of the needed CI nodes and edges, and communicate that data in an assembled manner for augmenting the displayed and filtered visualization 102.

Figure 2:
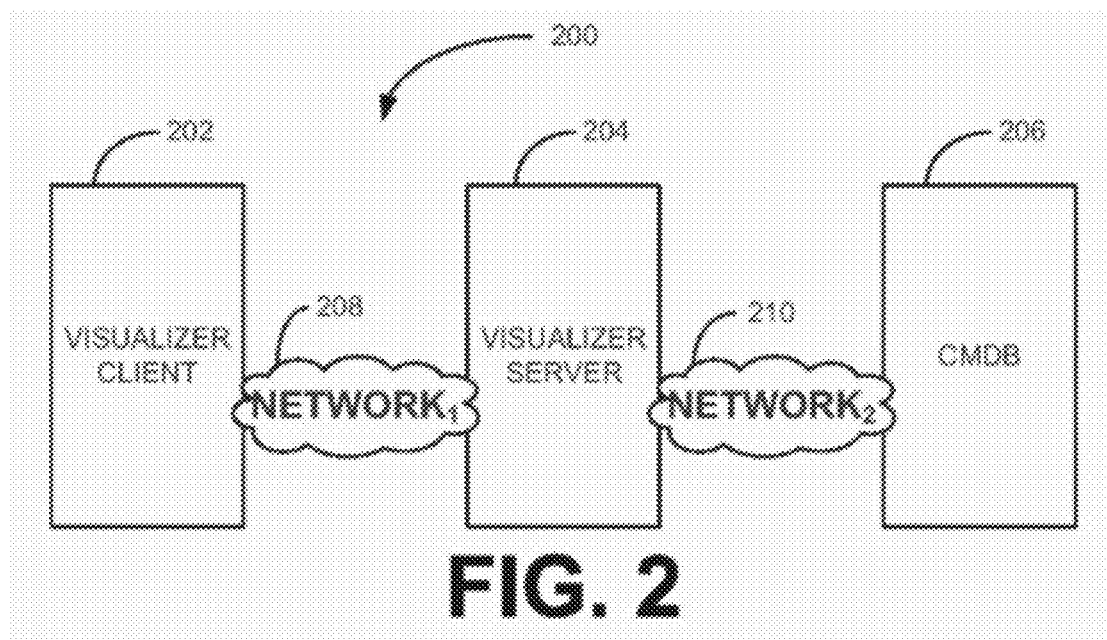
FIG. 2 is a block diagram of a system according to an example embodiment.

FIG. 2 is a block diagram of a system 200 according to an example embodiment. The system 200 includes a visualizer client 202, a visualizer server 204, and a Configuration Management Database (CMDB). In some embodiments, the visualizer client 202 is interconnected via a network 208 to the visualizer server 204. The visualizer server is also interconnected via a network 210 to the CMDB 206. The networks 208, 210 may the same or different networks. For example, the first network 208 may be one or more of a Local Area Network (LAN), a Wide Area Network (WAN), the Internet, or other network type, while the second network 210 may be a System Area Network (SAN). However, embodiments where the two networks 208, 210 are the same network, the network may include one or more of the network types enumerated above, among other network types.

The visualizer server 204 and the CMDB 206 are also illustrated as distinct computing devices. In other embodiments, the visualizer server 204 and the CMDB 206 may reside on the same physical computing device. In other embodiments, one or both of the visualizer server 204 and the CMDB 206 may include multiple computing devices that operate in a collaborative manner to provide the data processing functionality represented by the visualizer server 204 and the CMDB 206.

Although a single visualizer client 202 is illustrated, multiple such visualizer clients 202 may be present. In some embodiments, the visualizer client 202 is a general-purpose computer including a web browser application. The web browser, when displaying certain types of data, may utilize one or more plug-in type applications, such as the Adobe® Flash® Player application available from Adobe Systems Incorporated of San Jose, Calif.

The visualizer server 204 is typically a server-class computing device including server processes to receive and fulfill CI visualization requests from visualizer clients 202. The visualizer server 204 may receive a request from a visualizer client over the network 208, obtain the requested data from local cache, if present, or retrieve needed data from the CMDB 206 over the network 210 and build a data structure to according to the received request. The data structure, which in some embodiments is an XML or graphML encoded data structure, is then communicated to the visualizer client 202 over the network. The visualizer client 202 may then display a visualization as a function of the received data structure. In some embodiments, the web browser of the visualizer client 202 may include a plug-in capable of rendering a visualization, such as the visualization 102 of FIG. 1. In some embodiments, the data structure received by the visualizer client may also be received with an instruction set, such as a script or a compiled program, the execution of which on the visualizer client 202, will causes rendering of the visualization of the data structure.

Figure 3:
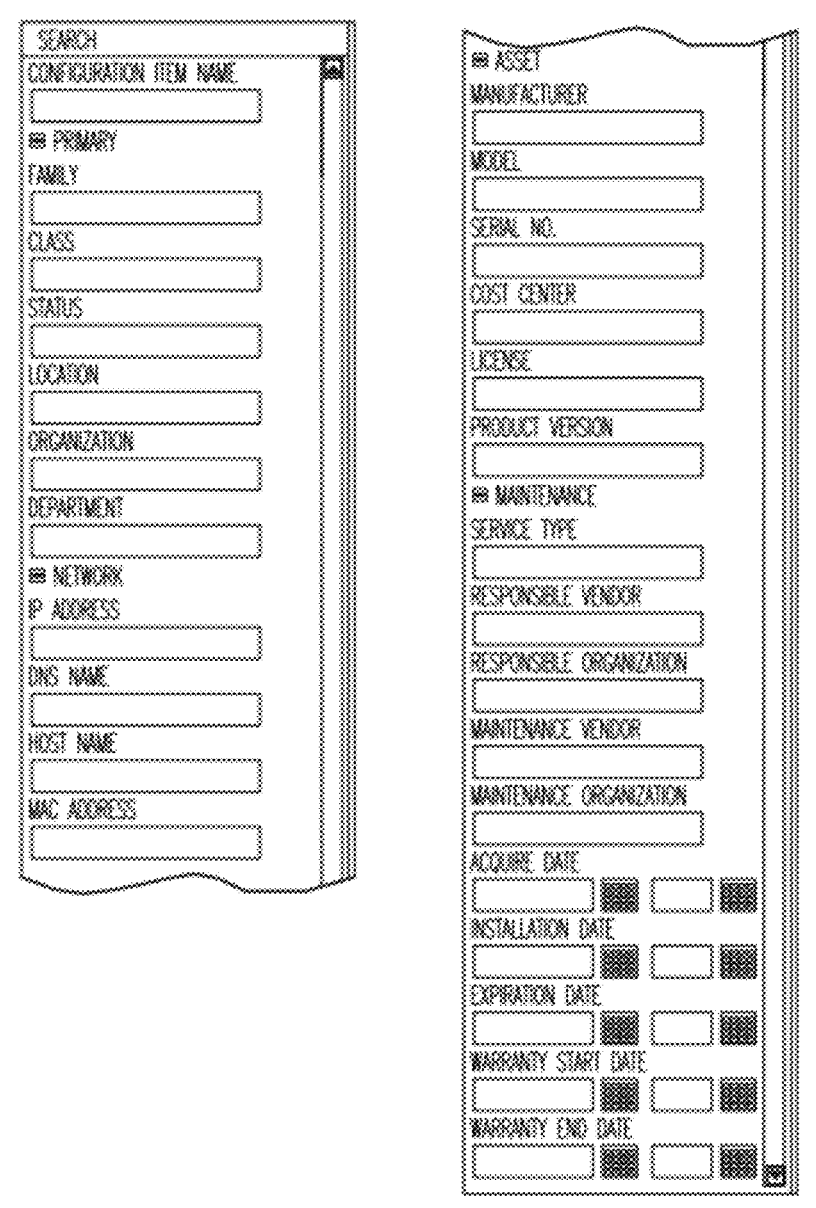

FIG. 3 is a user interface illustration of a CI search tool according to an example embodiment. The illustrated user interface allows for searching in several ways, such as by a name of a CI item if known, various properties of CIs, and actions performed or could be performed with regard to a CI. The user interface of FIG. 3 is a user interface that may be displayed in the sidebar 116 of the user interface illustrated in FIG. 1. In other embodiments, the user interface of FIG. 3 may be displayed in a web browser or other application on a client computing device. Data may be entered into the user interface and submitted, such as through a submit button or other user interface control, to a visualizer server. The visualizer server will perform a search according to the search criteria entered by the user by querying a CMDB. The result of that search may be presented to the requesting user in a user interface, such as is illustrated in FIG. 4.

Figure 4:
FIG. 4 is a user interface illustration of a result set provided in response to search performed using the search interface of FIG. 3, according to an example embodiment.

FIG. 4 is a user interface illustration of a result set provided in response to search performed using the search interface of FIG. 3, according to an example embodiment. The user interface of FIG. 4 may be displayed in the sidebar 116 of FIG. 1. In other embodiments, the user interface of FIG. 4 may be displayed in a web browser or other application on a client computing device. The search results displayed in the user interface are received from the visualizer server, discussed above, in response to a query received through the user interface of FIG. 3. The search results displayed in the user interface of FIG. 4 include CIs meeting the provided search criteria. In some embodiments, a user may select one of the displayed CIs and obtain a view of further data regarding the selected CI. Such a selection may be a gesture, hover, or other similar event. A selection of another type, such as a double-click, will cause an identifier of the selected CI to be submitted to the visualizer server as a focus CI from which to build a visualization, such as the visualization 102 of FIG. 1. The handling of a focus CI by a visualizer server is described with regard to FIG. 5 and FIG. 6.

Figure 5:
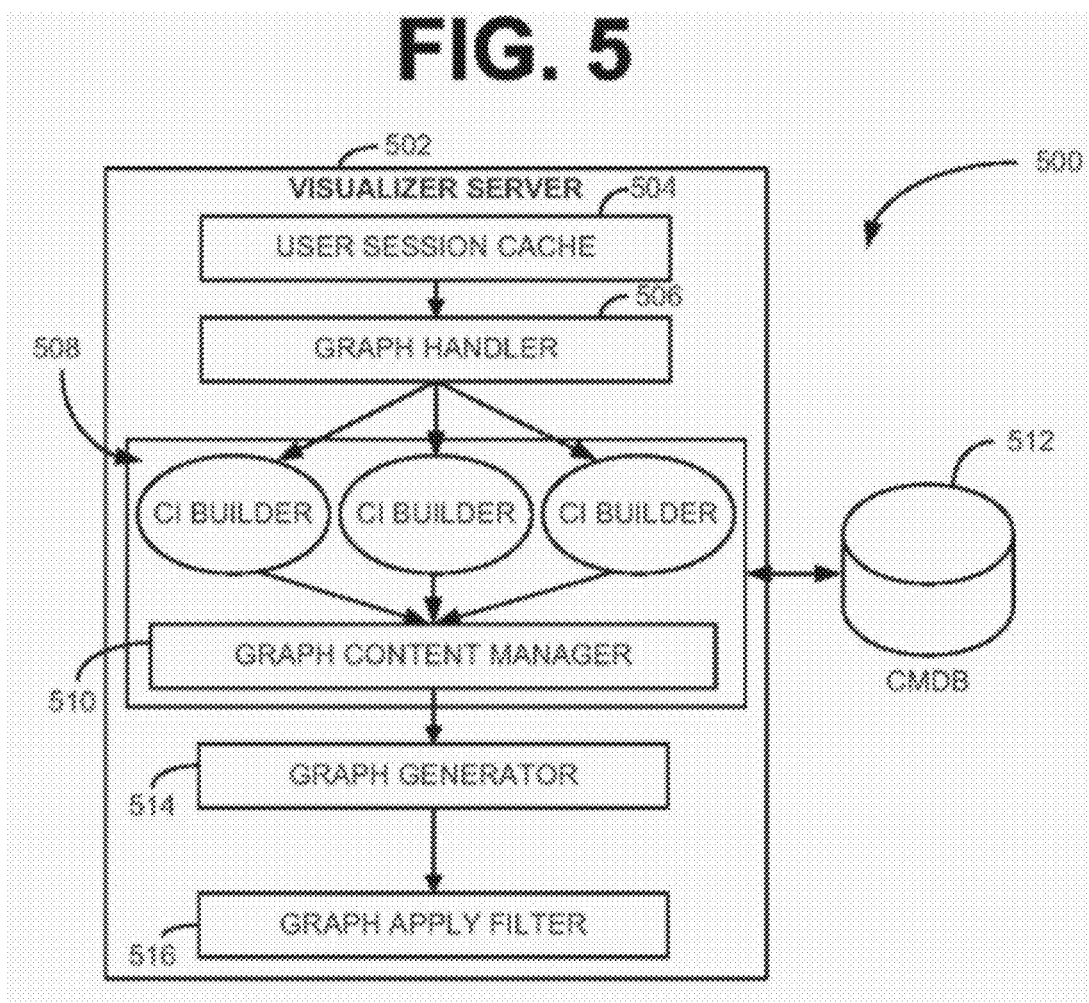
FIG. 5 is a block diagram of a system according to an example embodiment.

FIG. 5 is a block diagram of a system 500 according to an example embodiment. The system 500 includes a visualizer server 502 and a CMDB 512. The visualizer server 502 and CMDB 512 may be operably connected over a network or may reside on a single computing device. In other embodiments, elements of one or both of the visualizer server 502 and CMDB 512 may be distributed across two or more computing devices in a networked computing environment.

The visualizer server 502 is typically operable to receive CI visualization requests from clients over a network, to build data structures with data from at least one of a cache and the CMDB 512, and to communicate the data structures to respective requesting clients. The data structures the visualizer server 502 builds are capable of being visually rendered by the clients. The visual renderings are visual representations of computing environment topologies comprised of CIs and relations there between represented in the CMDB 512.

The visualizer server 502 may include a user session cache 504 that caches previously built data structures comprised of CI nodes and relations, referred to as edges, there between. In an instance where the visualization server 502 receives a focus CI from which to build a visualization data structure, the visualization server 504 will first check the user session cache 504 to see if the requested data structure is present therein. If it is present, the visualization server 502 responds to the client visualization request with a data structure from the user session cache 504. For example, if a user submits a request to change the number of visualization levels already displayed to the user to fewer levels, the data of each of the levels is likely to be available in the user session cache 504. In such an instance, the request may be responded to with the data from the user session cache 504. In some embodiments, when some of the data for responding the client visualization request is not present, only the additionally needed data is obtained and the user session cache data is augmented. For example, if a user submits a request to change the number of visualization levels already displayed to the user to more levels, the data of the levels already displayed may be obtained from the user session cache 504 and only the data of levels not already in the user session cache 504 is obtained, used to service the request, and cached in the user session cache 504. In instances where none of the data necessary to fulfill the visualization request is present, all of the needed data is obtained by the visualization server 502.

To obtain the needed data not present in the user session cache, a graph handler module 506 retrieves CI identifiers from the CMDB 512 as a function of the focus CI received from the requesting client. The CI identifiers may be retrieved one level at a time from the CMDB 512 for a number of levels either specified in the request or may be configured within the system 500 as a default or in association with the particular requesting client or authenticated user thereof. The number of levels may be three below the focus CI, however, any number of levels may be specified, limited only by the number of CI levels represented in a CMDB 512 of particular embodiments. The data in the CMDB 512 is typically stored in a hierarchical manner. For example, a first CI will be stored as a parent CI. A second set of CIs may be stored as children of the parent. In such an instance, a first node CI may be a parent and a second node CI stored as a child. The parent/child relationship may be represented in the CMDB 512 by an edge. The edge may be stored in the CMDB in any number of ways. One such way may be through use of a linking table that stored data representative of one or more relations between a child CI and one or more parent CIs. In other embodiments, the reverse may be stored where a patent CI may be represented in the linking table as a parent of one or more child CIs. In yet other embodiments, a CI table in the CMDB may include columns to hold data identifying one or more parent or children CIs. Many relational schemes to represent edges between CIs may be present in various embodiments as is readily apparent to one of skill in data processing and database computing.

Returning to the graph handler module 506, the graph handler module 506 retrieves CI identifiers one level at a time. However, depending on the data schema in the CMDB 512, the graph handler may submit a single query to the CMDB 512 to obtain the needed CI identifiers, Once the graph handler module 506 has the CI identifiers, the graph handler will invoke a CI builder module 508 for each of the retrieved CI identifiers. When a data processing device upon which the visualization server 502 is executing includes multiple computer processors or a processor including a plurality of processing cores, a CI builder module 508 may be invoked on each of at least two processors or processing cores. As a result, the data for each CI may be obtained and assembled by the invoked CI builder modules 508 in parallel. In further embodiments, the CI builder modules 508 may exist as web services, or other processes that may be remotely called and executed.

In some embodiments, the CI builder modules 508, upon receipt of a CI for which to data is to be obtained, may first check a cache for the presence of the requested data. If the data was previously obtained for the particular CI and that data is still current, the CI builder module 508 will retrieve the data from cache and forward that data to a graph content manager module 510.

When the data is not present in a cache, or in an embodiment not including a CI Builder module 508 cache, the CI builder module 508 will obtain data from the CMDB 512 and build data structures for each CI and relations there between. For example, a CI Builder module 508 may build a data structure for a focus CI such as the following XML representation of a focus CI:

```
<CI DTP_count="2" DTP_is_more_levels_fetch="false"
PTD_count="469"
    PTD_is_more_levels_fetch="false"
    fci_uuid="A9DBDA0A176ACA4AB357118FD390EA19"
    is_focus="true"
    level="1" levels_fetched="1">
    <CI_ID>A9DBDA0A176ACA4AB357118FD390EA19</CI_ID>
    <CI_Name>TIER1-4</CI_Name>
    <Family_ID>602</Family_ID>
    <Status_ID/>
</CI>
```

Another CI builder process may build a data structure for a CI that is a child of the focus CI such as the following XML representation of a CI:

```
<CI DTP_count="3" DTP_is_more_levels_fetch="false"
PTD_count="0"
    PTD_is_more_levels_fetch="false"
    fci_uuid="A9DBDA0A176ACA4AB357118FD390EA19"
    level="2">
    <CI_ID>E49EA4A84C36B443A152FAC9096E1A14</CI_ID>
    <CI_Name>usilap59.ca.com</CI_Name>
    <Family_ID>400002</Family_ID>
    <Status_ID/>
</CI>
```

Yet another CI builder process may build a data structure for an edge that relates the child CI to the parent, focus CI such as the following XML representation of an edge:

```
<Relation fci_uuid="A9DBDA0A176ACA4AB357118FD390EA19">
    <Child_CI>E49EA4A84C36B443A152FAC9096E1A14</Child_CI>
    <Parent_CI>A9DBDA0A176ACA4AB357118FD390EA19</Parent_CI>
    <Relation_Type_ID>400007</Relation_Type_ID>
    <level>2</level>
</Relation>
```

In embodiments including a CI Builder module 508 cache, the CI Builder modules 508 may cache the built data structures for subsequent use to remove the need to rebuild the data structures. As a result of the CI Builder module 508 caching, the user session cache 504, and the parallel processing by the CI Builder modules 508, the efficiency at which the system 500 operates to provide requesting clients configuration item visualization data is quite high. This is particularly helpful as the size and complexity of computing environments of large organizations continue to grow. The number of CIs in large organizations may be in the hundreds of thousands and even over one million. The efficiencies through parallelization and reuse of previously obtained and cached data allow for visualization to be a timely and useful tool.

After each of the data structures are either retrieved from cache or built by the CI Builder modules 508, the data structures are forwarded to the graph content manager module 510. The graph content manager module 510, upon receipt of the data structures from the CI Builder modules 508, aggregates the data into a single data structure. This single data structure is typically encoded in a markup language, such as XML or form derived therefrom. This single data structure may be referred to as a master XML document.

In some embodiments, the requesting client may include an applicant capable of rendering a visualization from the master XML document. In such instances, the master XML document may then be transmitted to the requesting client over a network. However, in other embodiments, the master XML document may be further processed to allow the client to render a visualization. For example, the master XML document may be forwarded to a graph generator module 514. The graph generator module 514 is typically operable to translate the mater XML document into a client renderable format, such as graphML. The graph generator module 514, in some embodiments, translates the master XML document to graphML according to processes that may invoke classes from the yFiles class libraries available from yWorks of Tübingen, Germany. Along with translating the master XML document to graphML, or other suitable format for rendering a visualization on a client computing device, translated data may be augmented with computer code, such as scripting or compiled code. For example, translating may include adding scripting code, such as Flex code that is executable by an Adobe® Flash® Player application plug-in. As a result, a visualization rendered as a function of the translated data structure may be interactive to received user input. This may include zooming, modifying, collapsing and expanding of levels, and other functionality depending on the needs of the particular embodiment. However, in some embodiments, a node CI may include code that allows for the node, when rendered, to be modified and for modifications to be saved back to the CMDB 512. The graph generator module 514 may also embed graphic items, such as icons representative of certain types of nodes, in the translated data structure. The graphic items may be rendered as visual representations of particular CI types, such as an icon that is visually representative of a server and icons that are visually representative of routers, clients; applications, configuration settings, and other CI types.

Following the translation by the graph generator module 514, the translated data structure, which will now be referred to as a graph, may be forwarded to the requesting client for rendering. However, in some embodiments, a filter may be applied to the graph. A filter may be applied by a graph apply filter module 516 to modify how the graph will appear when visually rendered by a client computer application. For example, a filter may hide certain CIs, collapse or expand certain levels or portions of a graph, or otherwise modify the appearance of the graph when rendered. A filter may also apply a defined appearance to a graph such as might be defined as a user preference, an organizational policy, a product branding requirement, or for other purposes. The defined appearance may specify graphic elements that represent CI types, line weights and colors, background colors, branding graphics to be displayed within the graph, amongst other possible elements of a visualization that a user may wish to modify.

In some embodiments, when a visualization request is received from a client, the visualization request may specify a filter, if any, to be applied. The graph apply filter module 516 may also include analytical filters that provide views of CIs that allow a user to view or perform particular analytics about a computing environment topology. Some example filters may include a trace relation filter that may allow a user to specify two focus CIs and provides a view of how the two focus CIs are related view other nodes and edges there between. Other filters include root cause analysis, asset information, help desk, change impact analysis, incident/problem priority, and disaster recovery.

In some embodiments, the graph apply filter module 516 may apply more than one filter. For example, a first filter may be applied according to corporate branding strategy that species colors of graphical elements. A second filter may also be applied for a certain analytic purpose, such as disaster recovery which may filter the graph to identify critical assets within a computing environment topology at different levels for prioritization purposes during recovery.

The graph, once translated, may be stored to the user session cache. However, the graph may be stored prior to or after application of one or more filters by the graph filter module 516. The graph may then be forwarded to the requesting client for rendering, storing, or further processing.

Note that in some embodiments, a client application process may also apply a filter or receive input specifying a filter to be applied. An identification of a filter may then be sent back to the visualization server which may then retrieve the graph from the user session cache and the graph apply filter module 516 may apply the different filter to the graph. The newly filtered graph may then be returned back to the client.

Figure 6:
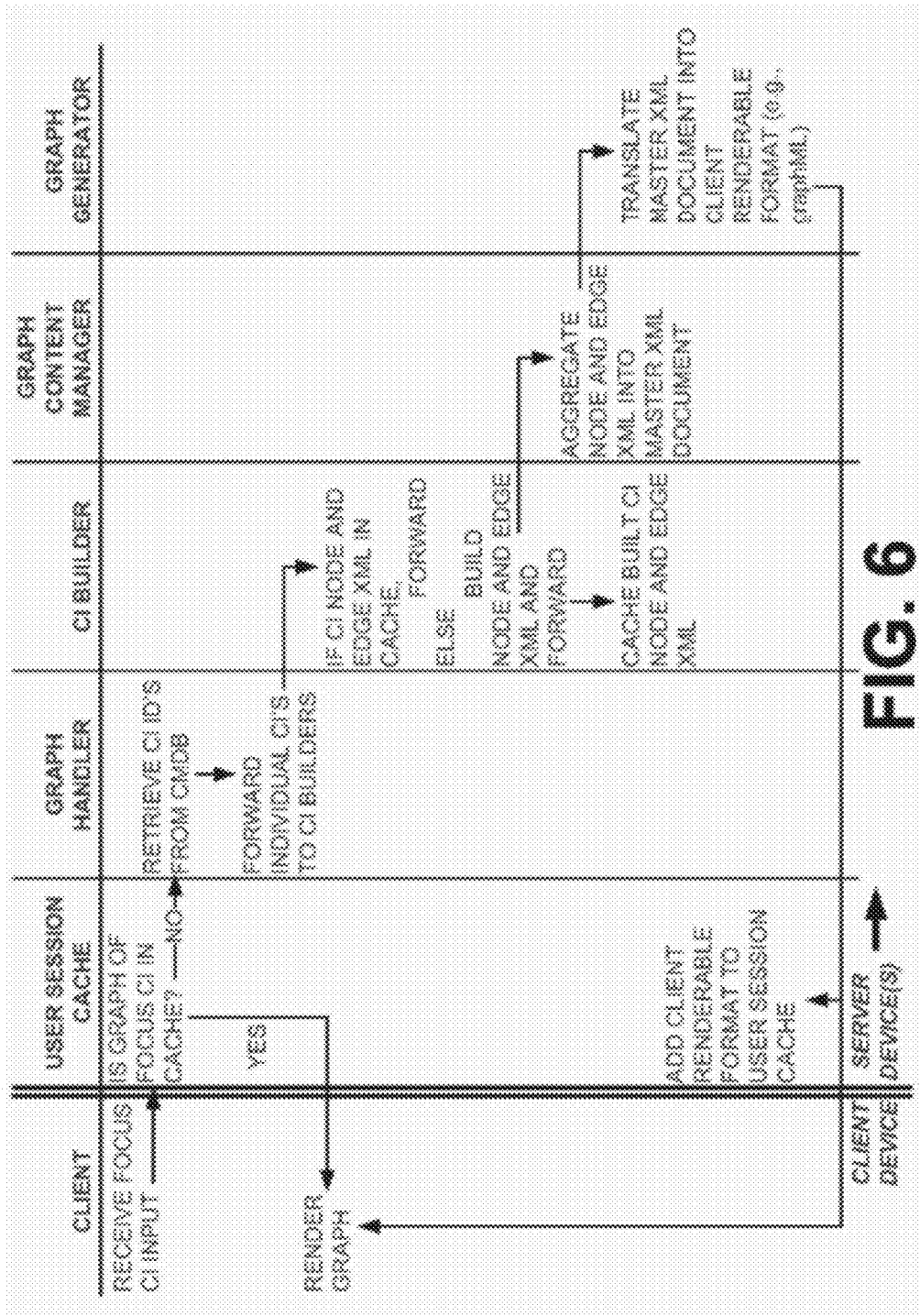
FIG. 6 is a process flow diagram of rendering a Configuration Management Visualization according to an example embodiment.

FIG. 6 is a process flow diagram of rendering a Configuration Management Visualization according to an example embodiment. The process illustrated in FIG. 6 is a general view of an example embodiment of a process described with regard to the system 500 of FIG. 5. The process includes receiving a visualization request with a focus CI from a client and fulfilling the client request from the user session cache or building the graph if the graph is not in the cache.

Figure 7:
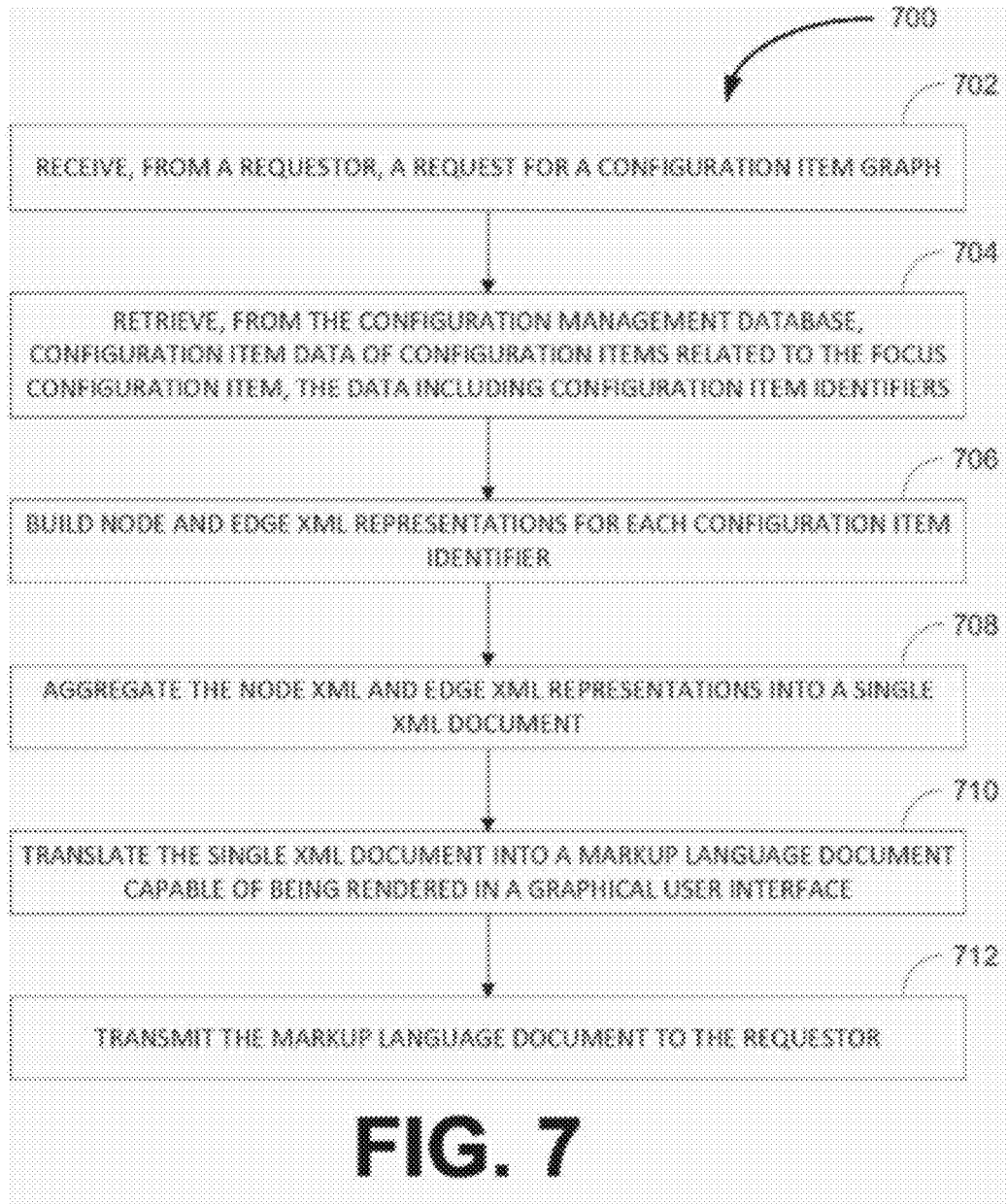
FIG. 7 is a block flow diagram of a method according to an example embodiment.

FIG. 7 is a block flow diagram of a method 700 according to an example embodiment. The method 700 is an example of a method that may be performed by a visualization server or a cluster of server processes executed on disparate computing devices, such as server computing devices operating as application servers and/or database servers.

The example method 700 includes receiving 702, from a requestor, a request for a configuration item graph. The received 702 request may include an identifier of at least one focus configuration item represented in a configuration management database, where each received focus configuration item is a configuration item from which to generate a configuration item graph.

The method 700 further includes retrieving 704, from the configuration management database, configuration item data of configuration items related to the focus configuration item, the data including configuration item identifiers. A process may then be executed for each retrieved configuration item identifier on individual processing cores of a multi-core processor, on each of two or more processors in a multiprocessor computing device, or on multiple remote servers, to build node and edge mill representations. For example, the process invoked in each instance may include receiving a configuration item identifier and retrieving data of the configuration item from the configuration management database as a function of the received configuration item identifier. The process may then build 706 a node XML representation of the configuration item and an edge XML representation of how the configuration item is related to a parent configuration item, when there is such a relation. The method 700 then aggregates 708 the node XML and edge XML representations into a single XML document a master XML document) and translates 710 the single XML document into a markup language document capable of being rendered in a graphical user interface (e.g., graphML). The markup language document is then transmitted 712 to the requestor.

The method 700 may further include, caching, in a memory device, the built 706 node and the edge XML representations. Then subsequently received 702 configuration item graph requests may be serviced from the cache. For example, prior to retrieving data of a configuration item, the method 700 may include checking the cache for the existence of the previously built 706 node and edge XML representations needed for the configuration item. When the node and edge XML representations needed for the configuration item exist in the cache, such embodiments include utilizing the cached node and edge XML representations without rebuilding the node and edge XML representations.

Figure 8:
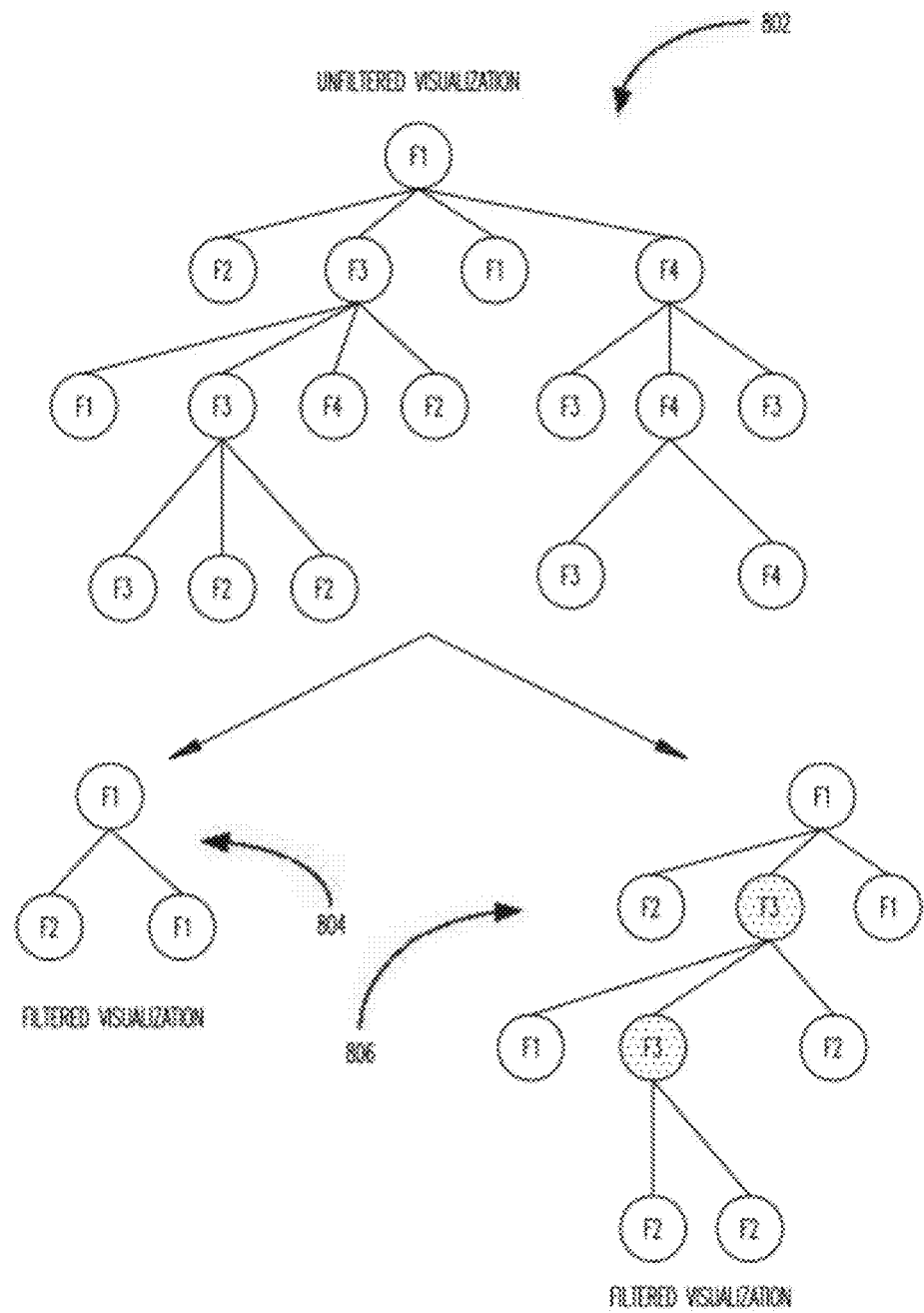
FIG. 8 includes illustrations of filtered and unfiltered visualizations of Configuration Items according to an example embodiment.

FIG. 8 includes illustrations of filtered 804, 806 and unfiltered 802 visualizations of Configuration Items according to an example embodiment. The visualizations 802, 804, 806 each include node types F1, F2, F3, and P4 connected by edges that illustrate relations. The filtered visualizations 804, 806 provide example of how certain filters can be applied. For example, the filtered visualization 804 is filtered to show directly related relations of node types F1 and F2. The filtered visualization 806 instead shows all relations of F1 and F2. You will note in this filtered visualization 806 that there is an intervening node type of F3. This filter displays F3, but changes the appearance of F3 to indicate it is not of particular interest as it is not of node type F1 or F2. However, this filtered visualization 806 provides a view of all node types F1 and F2. This is merely an illustrative example of how filters may be applied to visualizations. Other filters may be created depending on the particular embodiment. For example, a predefined or user defined filter may be created and subsequently applied to a graph that filters on one or more of various CI attributes. Such attributes may include one or more of class, vendor, location, device type, network type, administrator information, and other attribute data that may be stored, derived, or otherwise obtained with regard to the CIs. In some embodiments, a user defined fitter may be generated as an extension of another predefined or user defined filter.

Figure 9:
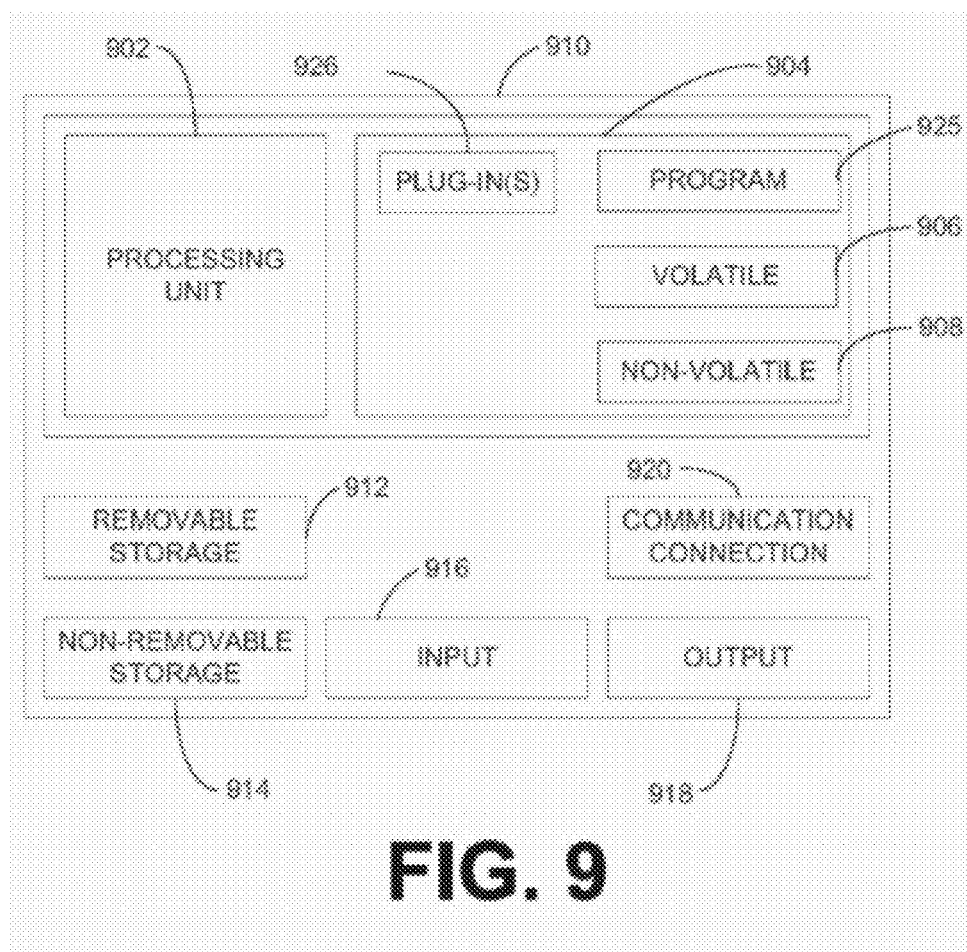
FIG. 9 is a block diagram of a client computing device according to an example embodiment.

FIG. 9 is a block diagram of a client computing device according to an example embodiment. One example computing device in the form of a computer 910, may include at least one processing unit 902 including one or more processing cores, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD), or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers, such a visualization server. The communication connection may include one or more of Local Area Network (LAN), a Wide Area Network (WAN), the Internet, and other networks.

Computer-readable instructions stored on a computer-readable medium are executable by the processing unit 902 of the computer 910. A hard drive, CD-ROM, and RAM are some examples of articles including a computer-readable medium upon which computer programs and data may be stored. For example, a web browser computer program 925 capable of rendering visualizations of CIs based on data received over the communication connection 920. The web browser computer program 925 may utilize one or more plug-in applications 926 to render the CI visualizations.

Figure 10:
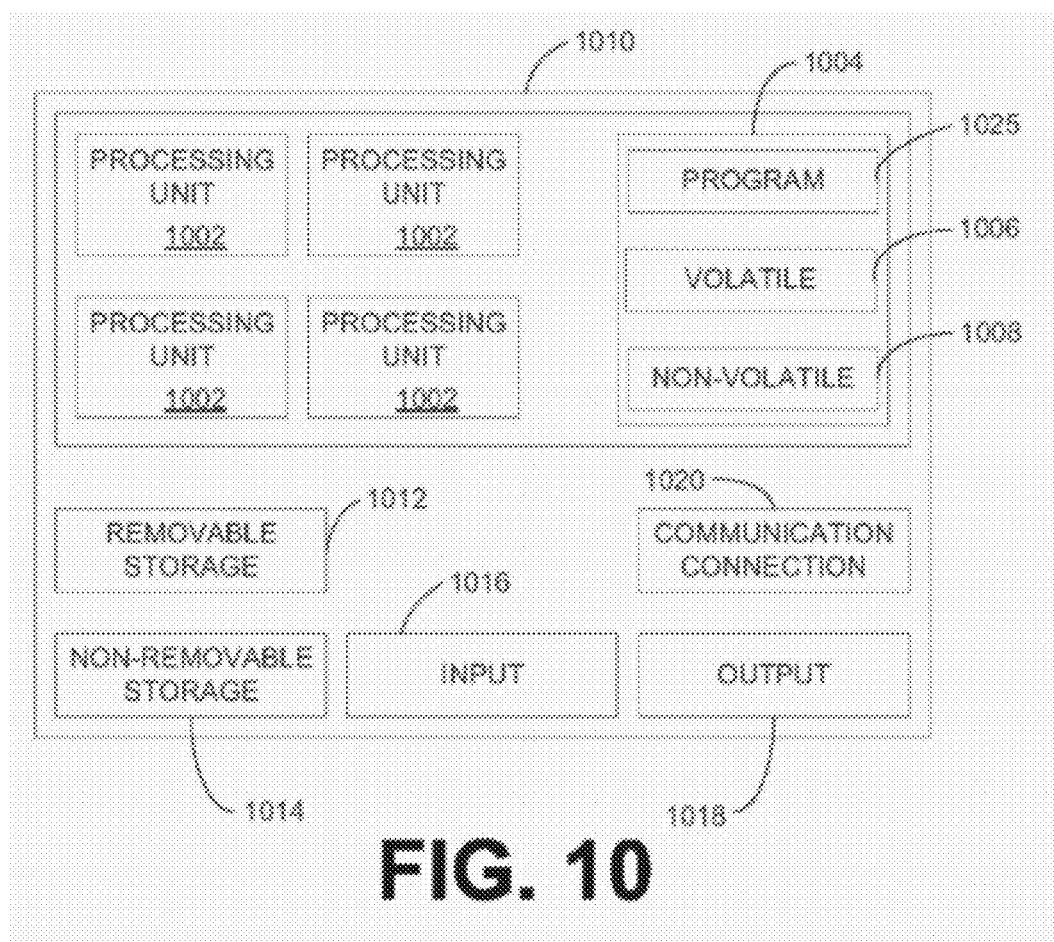
FIG. 10 is a block diagram of a server computing device according to an example embodiment.

FIG. 10 is a block diagram of a server computing device according to an example embodiment. In one embodiment, multiple such server computer devices are utilized in a distributed network to implement multiple components in a transaction-based environment. Object-oriented, service oriented, or other architectures may be used to implement such functions and communicate between the multiple systems, components, and clients, such as is illustrated in FIG. 9. One example server computing device in the form of a server computer 1010, may include one or more processing units 1002, each of which may include multiple processing cores. The server computer 1010 may further include a memory 1004, removable storage 1012, and non-removable storage 1014. Memory 1004 may include volatile memory 1006 and non-volatile memory 1008. Server computer 1010 may include—or have access to a computing environment that includes—a variety of computer-readable media, such as volatile memory 1006 and non-volatile memory 1008, removable storage 1012 and non-removable storage 1014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Server computer 1010 may include or have access to a computing environment that includes input 1016, output 1018, and includes communication connection 1020. The server computer 1010 operates in a networked environment using the communication connection 1020 to connect to one or more remote computers, such as database servers, other application servers, and to client computing devices. The remote computer may include a personal computer (PC), server, router, network PC, a peer device or other common network node, or the like. The communication connection may include one or more of a Local Area Network (LAN), a Wide Area Network (WAN), the Internet, and other networks.

Computer-readable instructions stored on a computer-readable medium are executable by the processing unit(s) 1002 of the server computer 1010. A hard drive, CD-ROM, and RAM are some examples of articles including a computer-readable medium that may store the computer-readable instructions. The computer-readable instructions may include instructions to perform one or more of the methods, or portions thereof, described herein.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
  receiving, from a requestor, a request for a configuration item graph visualization, the request including an identifier of at least one focus configuration item from which to generate a configuration item graph visualization;
  retrieving, from a configuration management database, configuration item data of configuration items related to the focus configuration item, the data including configuration item identifiers;
  executing, on at least processor, a process for each retrieved configuration item identifier to:
    receive a configuration item identifier;
    prior to retrieving data of a configuration item:
      checking a cache for existence of node and edge representations needed to fulfill the configuration item graph visualization request with regard to the received configuration item identifier; and
      when node and edge representations needed for the configuration item exist in the cache, retrieving the cached node and edge representations without rebuilding the node and edge representations;
    for node and edge representations of retrieved configuration items not present in the cache, build, based on respective retrieved configuration item data, and cache a node representation of the configuration item and an edge representation of how the configuration item is related to a parent configuration item, when there is such a relation; and
  aggregating the node and edge representations retrieved from the cache and as built into a configuration item graph visualization;
  transmitting the configuration item graph visualization to the requestor.

2. The method of claim 1, wherein the configuration item graph visualization is a renderable markup language representation.

3. The method of claim 1, further comprising:
  servicing future requests from requestors for configuration item graphs including the same focus configuration item identifier with the cached markup language document.

4. The method of claim 1, wherein:
  the at least one processor includes at least one multi-core processor; and
  the executing of the process for each retrieved configuration item identifier to includes multiple instances of the process executing in parallel on a plurality of the processing cores of the multi-core processor.

5. A non-transitory computer-readable storage device, with instructions stored thereon that are executable by at least one processor of a computer to cause the computer to:
  retrieve configuration item data of configuration items related to at least one focus configuration item identified in a request from a requestor, the configuration item data including configuration item identifiers;
  for each retrieved configuration item identifier:
    check a cache for existence of node and edge representations needed to fulfill the request with regard to the respective retrieved configuration item identifier;
    when node and edge representations needed for the configuration item of the respective retrieved configuration item identifier exist in the cache, retrieve the cached node and edge representations from the cache without rebuilding the node and edge representations; and
    when node and edge representations needed for the configuration item of the respective retrieved configuration item identifier does not exist in the cache, build, based on respective retrieved configuration item data, and cache a node representation of the configuration item and an edge representation of how the configuration item is related to a parent configuration item, when there is such a relation; and
  aggregate the node and edge representations retrieved from the cache and as built into a configuration item graph visualization;
  transmit configuration item graph visualization to the requestor.

6. The non-transitory computer-readable storage device of claim 5, wherein the configuration item graph visualization is a renderable markup language representation.

7. The non-transitory computer-readable storage device of claim 6, wherein the renderable markup language representation is graphML.

8. The non-transitory computer-readable storage device of claim 5, with further instructions stored thereon that are executable by the at least one processor to cause the computer to:
  service future requests from requestors for configuration item graphs including the same focus configuration item identifier with the cached markup language document.

9. The non-transitory computer-readable storage device of claim 5, wherein:
  the at least one processor includes at least one multi-core processor; and
  a plurality of the retrieved configuration item identifiers are processed in parallel across a plurality of processing cores of the multi-core processor.

10. A system comprising:
  at least one processor, at least one memory device, and a network interface coupled to a bus;
  a handler module stored in the at least one memory device and executable by the at least one processor to:
    retrieve configuration item data of configuration items related to at least one focus configuration item identified in a request from a requestor received via that at least one network interface device, the configuration item data including configuration item identifiers; and
    for each retrieved configuration item identifier:
      check a cache for existence of node and edge representations needed to fulfill the request with regard to the respective retrieved configuration item identifier;
      when node and edge representations needed for the configuration item of the respective retrieved configuration item identifier exist in the cache, retrieve the cached node and edge representations from the cache without rebuilding the node and edge representations; and when node and edge representations needed for the configuration item of the respective retrieved configuration item identifier does not exist in the cache, build, based on respective retrieved configuration item data, and cache a node representation of the configuration item and an edge representation of how the configuration item is related to a parent configuration item, when there is such a relation; and an aggregation module stored in the at least one memory device and executable by the at least one processor to:
aggregate the node and edge representations retrieved from the cache and as built into a configuration item graph visualization;

a transmission module stored in the at least one memory device and executable by the at least one processor to:
transmit the configuration item graph visualization to the requestor.

11. The system of claim 10, wherein the configuration item graph visualization is a renderable markup language representation.

12. The system of claim 11, wherein the renderable markup language representation is graphML.

13. The system of claim 10, wherein the handler module services future requests from requestors for configuration item graphs including the same focus configuration item identifier with the cached markup language document.

14. The system of claim 10, wherein:
the at least one processor includes at least one multi-core processor; and
a plurality of the retrieved configuration item identifiers are processed in parallel across a plurality of processing cores of the multi-core processor.

* * * * *